(12) United States Patent
Piponi (10) Patent No.: US 8,203,570 B1
(45) Date of Patent: Jun. 19, 2012

(54) POLYGON KERNELS FOR IMAGE PROCESSING

(75) Inventor: Dan Piponi, Oakland, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 960 days.

(21) Appl. No.: 12/055,034

(22) Filed: Mar. 25, 2008

(51) Int. Cl.
*G09G 5/00* (2006.01)
(52) U.S. Cl. .................................................. 345/581
(58) Field of Classification Search .................. None
See application file for complete search history.

(56) References Cited

U.S. PATENT DOCUMENTS 6,853,386 B1 * 2/2005 Keim et al. ................... 345/647

OTHER PUBLICATIONS

*Adjoint operators*, Stanford Exploration Project, Dec. 26, 2000, accessed online http://sepwww.stanford.edu/sep/prof/bei/conj/paper_html/node1.html, 2 pages.
Hüttemann, Thomas. *On a theorem of Brion*, arXiv:math/0607297v2 [math.CO], Jul. 25, 2006, pp. 1-11.
Knudsen, Michael. *Brion's Theorem*, Apr. 28, 2004, pp. 1-7.
Woods, John M. *Multidimensional Signal, Image, and Video Procession and Coding*, Second Edition, 2012 Elsevier Inc.
Baaziz N. and E. Dubois. Separable diamond-shaped filtering for hybrid HDTV image sequence coding. In *8th Workshop on Image and Multidimensional Signal Processing*, pp. 162-163, Cannes, France, Sep. 1993. 2 pages.
Barvinok, Alexander . *A course in convexity*, Graduate Studies in Mathematics, vol. 54, American Mathematical Society, Providence, RI, 2002.
Barvinok, Alexander I. *A polynomial time algorithm for counting integral points in polyhedra when the dimension is fixed*, Math. Oper. Res. 19 (1994),769-779.
Barvinok, A. and J. Pommersheim. 1996-1997. An algorithmic theory of lattice points in polyhedra. In *New Perspectives in AlgebraicCombinatorics*.91-147.
Baum, Paul et al. *Lefschetz-Riemann-Roch for singular varieties*, Acta Math. 143 (1979), No. 3-4, 193-211.
Beck, Mathias et al.*Formulas of Brion, Lawrence, and Varchenko on Rational Generating Functions for Cones*. May 16, 2006. arXi.math/0506466v3 [math.CO]. pp. 1-15.
Beck, Mathias and Frank Sottile. *Irrational proofs of three theorems of Stanley*, 2005, European J. Combin.,to appear. math. CO/0501359.
Blinn, J. "Computer Display of Curved Surfaces." PhD. Dissertation. Department of Computer Science. University of Utah. Dec. 1978.
Blinn, J. and M. Newell. "Texture and Reflection on Computer Generated Images". *Communications of the ACM*. vol. 19. #10., Oct. 1976.
Bresenham, J.E. Algorithm for computer control of digital plotter. *IBM System Journal*, 4(1):25-30, 1965.
Brion, M. and M. Vergne. 1997. Lattice points in simple polytopes. *Journal of the American Mathematical Society 10*, 371-392.
Catmull, E. and Smith A. R. "3-D Transformation of Images in Scanline Order". *Computer Graphics* (Proc, Siggraph '80). vol. 14. Jul. 1980.

(Continued)

*Primary Examiner* — Ryan R Yang
(74) *Attorney, Agent, or Firm* — Fish & Richardson P.C.

(57) ABSTRACT

A computer-implemented method includes selecting a polygon that includes a convex shape defined by vertices represented by integer coordinates. The method also includes determining a polygon transfer function from cones defined by some of the vertices. The polygon transfer function defines image processing operations independent of the scale of the polygon.

25 Claims, 7 Drawing Sheets

OTHER PUBLICATIONS

Catmull, E.. "A Subdivision Algorithm for Computer Display of Curved Surfaces." PhD. Dissertation. Department of Computer Science. University of Utah. Tech. Report UTEC-CSc-74-133. Dec. 1974.

Crow, F. C. 1984. Summed-area tables for texture mapping. In *SIGGRAPH '84: Proceedings of the 11th annual conference on Computer graphics and interactive techniques*. ACM Press, 207-212.

De Loera, Jesus A. et al. *A user's guide for LattE vl.1*, software package LattE (2004), electronically available at http://www.math.ucdavis.edu/~latte/.

Dudgeon, D. E. et al. 1983. *Multidimensional Digital Signal Processing*. Prentice-Hall.

Ferrari, L.A. and J. Sklansky. A fast recursive algorithm for binary-valued two dimensional filters. *Computer Vision, Graphics, and Image Processing*, 26(3):292-302,1984.

Feibush. E. A. et al. "Synthetic Texturing Using Digital Filters." *Computer Graphics* (Proc, Siggraph '80). vol. 14. Jul. 1980.

Fournier, A. et al. "Computer Rendering of Stochastic Models." *Communications of the ACM*. vol. 25. #6. Jun. 1982.

Glasbey, C. and R. Jones. Fast computation of moving average and related filters in octagonal windows. *Pattern Recognition Letters*, 18(6):555-565, Jun. 1997.

Groemer, H. *On the extension of additive functionals on classes of convex sets*, Pacific J. Math. 75 (1978), No. 2, 397-410. MR MR0513905 (58 #24003).

Haruyama. S. and Barsky. B. A. "Using Stochastic Modeling for Texture Generation." IEEE *Computer Graphics and Applications*, vol. 4, # 3, Mar. 1984.

Heckbert, P. S. 1986. Filtering by repeated integration. In *SIGGRAPH '86: Proceedings of the 13th annual conference on Computer graphics and interactive techniques*. ACM Press, 315-321.

Ishida, Masa-Nori. *Polyhedral Laurent series and Brion's equalities*, Internat. J. Math. 1 (1990), No. 3, 251-265.

Jones, R. and P. Soille. Periodic lines: Definition, cascades, and application to granulometries. *Pattern Recognition Letters*, 17(10): 1057-1063, Sep. 1996.

Lawrence, James. *Polytope volume computation*, Math. Comp. 57 (1991), No. 195, 259-271.

Lawrence, James. *Valuations and polarity*, Discrete Comput. Geom. 3 (1988), No. 4, 307-324.

Lewis, J. 1995. Fast normalized cross-correlation. Vision Interface.

Lim, J. S. 1989. *Two-Dimensional Signal and Image Prcoessing*. Prentice Hall.

Norton, A. et al. "Clamping: A Method of Antialiasing Textured Surfaces by Bandwidth Limiting in Object Space." *Computer Graphics* (Proc, Siggraph '82). vol. 16. #3, Jul. 1982.

Soille, P. et al. Recursive implementation of erosions and dilations along discrete lines at arbitrary angles. *IEEE Transactions on Pattern Analysis and Machine Intelligence*, 18(5):562-567, May 1996.

Soille, P. and H. Talbot. Directional morphological filtering. *IEEE Transactions on Pattern Analysis and Machine Intelligence*, 23(11):1313-1329, Nov. 2001.

Soler, C. and F.X. Sillion. 1998. Fast calculation of soft shadow textures using convolution. In SIGGRAPH '98: *Proceedings of the $25^{th}$ annual conference on Computer graphics and interactive techniques*. ACM Press, 321-332.

Stanley, R. P. 1999. *Enumerative Combinatorics*. vol. I. No. 49 in Cambridge Studies in Advanced Mathematics. Cambridge University Press.

Staunton, R. 1999. *Hexagonal Sampling in Image Processing*. vol. 107. Academic Press.

Sun, C. 2003. Diamond, hexagon, and general polygonal shaped window smoothing. In *Proc. VIIth Digital Image Computing: Techniques and Applications*, S. C, T. H., O. S., and A. T., Eds. Sydney.

van Droogenbroeck, Marca and Hugues Talbot. Fast computation of morphological operations with arbitrary structuring elements. *Pattern Recognition Letters*, 17(14):1451-1460,1996.

van Herk, M. A fast algorithm for local minimum and maximum filters on rectangular and octagonal kernels. *Pattern Recognition Letters*, 13(7):517-521, Jul. 1992.

Verbeek, P.W. et al. Low-level image processing by max-min filters. *Signal Processing*, 15(3):249-258, Oct. 1988.

Wilf, H. S. 1994. *generatingfunctionology*, Second ed. Academic Press Inc., Boston.

Williams, L. "Pyramidal Parametrics." *Computer Graphics*. vol. 17. #3. Jul. 1983.

Brion, Michel, "Intefer points in convex polyhedral," with English translation, Annals scientific Ct. NS $4^{th}$ Series, vol. 21, No. 4 (1988), p. 653-663.

Varchenko, A.N., "Combinatorics and topology of the disposition of affine hyperplanes in real space," Functional Analysis and its Applications, vol. 21, Jan.-Mar. 1987, pp. 11-22.

Volland, Walter. (English translation) Ein Fortsetzungssatz fur additive Eipolyederfunktionale im euklidischen Raum, Arch. Math. 8 (1957), 144-149. MR MR0092176 (19,1074d).

\* cited by examiner

```
for (int k = 0; k<3; ++k) {
  for (int j = height-1; j>=0; --j) {
    for (int i = width-1; i>=0; --i) {
      F(j,i,k) =
        G.read(j-1,i,k)+F.read(j,i+1,k)+F.read(j+2,i-1,k)-F.read(j+2,i,k)+
        F.read(j+2,i+1,k)-F.read(j+2,i+2,k)-F.read(j+4,i,k)+
        F.read(j+4,i+1,k);
    }
  }
} for (int j = height-1; j>=0; --j) {
  for (int i = 0; i<width; ++i) {
    H(j,i,k) =
      F.read(j,i+1,k)-F.read(j,i+2+a,k)+F.read(j+1,i+1,k)-F.read(j+1,i+2+a,k)-F.read(j+2,i+2,k)+
      F.read(j+2,i+1+a,k)-F.read(j+3,i+2,k)+F.read(j+3,i+1+a,k)-
      F.read(j+1+2*b,i+1+a+b,k)+F.read(j+1+2*b,i+2+a+b,k)-
      F.read(j+2+2*b,i+1+a+b,k)+F.read(j+2+2*b,i+3+a+b,k)-
      F.read(j+3+2*b,i+1+a+b,k)+F.read(j+3+2*b,i+2+a+b,k)-
      F.read(j+1+2*c,i+1-c,k)+F.read(j+1+2*c,i+2-c,k)+
      F.read(j+2+2*c,i+2-c,k)-F.read(j+2+2*c,i-c,k)-
      F.read(j+3+2*c,i+1-c,k)+F.read(j+3+2*c,i+2-c,k)-
      F.read(j+1+2*b+2*c,i+2+b-c,k)+
      F.read(j+1+2*b+2*c,i+1+a+b-c,k)-
      F.read(j+2+2*b+2*c,i+2+b-c,k)+
      F.read(j+2+2*b+2*c,i+1+a+b-c,k)+
      F.read(j+3+2*b+2*c,i+2+a+b-c,k)+
      F.read(j+3+2*b+2*c,i+1+b-c,k)-
      F.read(j+4+2*b+2*c,i+1+b-c,k)-
      F.read(j+4+2*b+2*c,i+2+a+b-c,k);
  }
}
```

POLYGON KERNELS FOR IMAGE PROCESSING

TECHNICAL FIELD

This document relates to using polygon shaped kernels for filtering images.

BACKGROUND

By processing pixels, digital images may be altered and adjusted to simulate various types of special effects. For example, pixel values may be processed for an image to appear brighter or darker, have a higher or lower contrast level or to apply another type of effect such as processing images of computer-synthesized surfaces to adjust shininess, transparency, texture, etc. For some image processing such as for image blurring, filtering techniques and methodologies may be implemented that may be complex and cumbersome, for example, for simulating camera defocus and depth of field.

SUMMARY

The systems and techniques described here relate to creating and using polygon kernels for processing images independent of the size of the polygon.

In one aspect, a computer-implemented method includes selecting a polygon that includes a convex shape defined by vertices represented by integer coordinates. A polygon transfer function is determined from cones defined by a portion of the vertices. The polygon transfer function defines image processing operations independent of the scale of the polygon.

Implementations may include any or all of the following features. The polygon transfer function may be determined by summing transfer functions of the cones or by executing similar operations. A processing table may be produced from operations defined by the polygon transfer function. The operations to produce the processing table (e.g., addition operations, subtraction operations, etc.) may be defined by the denominator of the transfer function. An image may be processed by using the processing table and operations defined by the polygon transfer function. For example, operations defined by the numerator of the polygon transfer function may be used to process the image. The operations to process the image may be dependent upon the scale of the polygon. Furthermore, operations to process the image may be independent of the scale of the polygon. Various of polygon shapes may be selected, for example, the polygon may be a hexagon.

In another aspect, a system includes a kernel manager to select a polygon that includes a convex shape defined by vertices represented by integer coordinates. The kernel manager also determines a polygon transfer function from cones defined by a portion of the vertices. The polygon transfer function defines image processing operations independent of the scale of the polygon.

In another aspect, a computer program product tangibly embodied in an information carrier and comprising instructions that when executed by a processor perform a method that include selecting a polygon that includes a convex shape defined by vertices represented by integer coordinates. The method also includes determining a polygon transfer function from cones defined by a portion of the vertices. The polygon transfer function defines image processing operations independent of the scale of the polygon.

Details of one or more implementations are set forth in the accompanying drawings and the description below. Other features, aspects and advantages will be apparent from the description and drawings, and from the claims.

DETAILED DESCRIPTION

Figure 1:
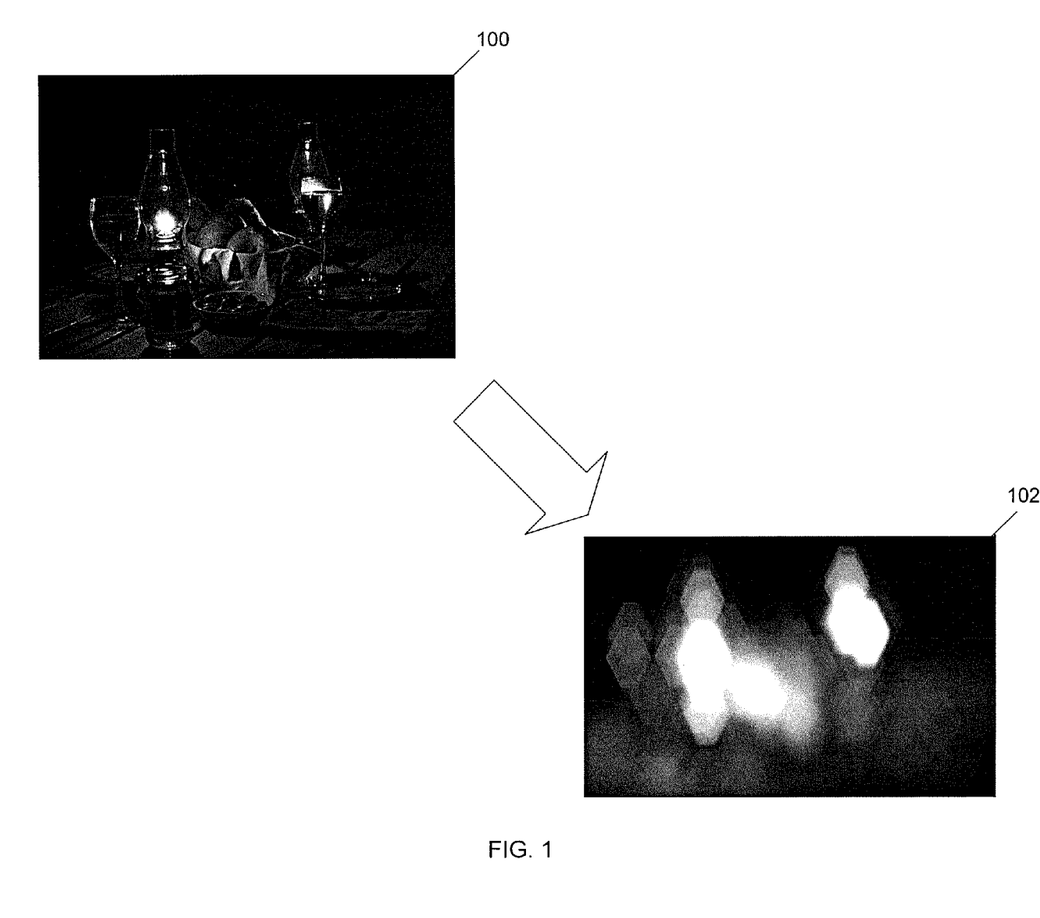
FIG. 1 illustrates image processing to produce a image blurring effect.

Referring to FIG. 1, a digital image 100 is illustrated that includes a relatively large number of pixels (e.g., 4 mega-pixels, 20 mega-pixels, etc.) that may be processed to produce an adjusted or altered image. For example, the pixels of the image 100 may be processed such that a "special effect" is applied to the image. In this illustration, the pixels of the image 100 are processed to produce a blurring effect that is illustrated in a blurred image 102. While various levels of blurring severity may be applied, in this example, portions of the image 100 are still distinguishable in the blurred image 102, however, in other scenarios the blurring effect may be so severe that the image 100 may be unrecognizable compared to the blurred image 102. By providing such a blurring effect, various scenarios such as camera defocus along with depth of field may be simulated.

Various techniques and methodologies may be implemented to produce a blurred image such as image 102. For example, for each pixel of the image 100, an average pixel value may be calculated from the pixel's value and from neighboring pixel values. However, using such a technique, some pixel values may be repeatedly summed for producing the average values and cause excessive consumption of computational resources. To improve computational efficiency, techniques may be implemented to reduce repeated summing of particular pixel values. For example, one or more processing tables such as summed-area tables may be produced to reduce repetitive summing of pixel values for computing averages. For summed-area tables, each table value corresponds to a position (x,y) of the image and is equivalent to the sum of the image pixel values in a rectangular area that includes the corner points (0,0), (0,y) (x,0) and (x,y). To calculate a particular average pixel value, a sum of pixels (in a rectangular area) may be provided from the summed-area table for the appropriate pixel neighborhood and divided by the number of pixels in the rectangular region. This average pixel value, which in effect is a value of the image after being blurring with a rectangular-shaped kernel, may be associated with a pixel to produce the blurred image.

In particular, the summed-area table may be used to calculate the sum of values for a rectangle aligned with a minimum corner including the point at (p,q) and a maximum corner including the point (x,y). In particular the sum is equivalent to the value:

$$S[x][y]-S[p][y]-S[x][q]+S[p][q]; \qquad (1)$$

in which S[x][y] represents the sum of pixel values included in a rectangle defined by corners coordinates (0,0) and (x,y).

Using the summed-area table to produce a blurred image is substantially equivalent to convolving the image with a rectangular-shaped filter kernel (referred to as a box filter). However, for convolving images with kernels associated with other polygon shapes, such as hexagons, diamond shapes, etc., other techniques need to be implemented for producing the needed processing tables. Furthermore one or more other techniques may be used for creating adjusted images from the processing tables. In some implementations, the processing tables may be produced such that the table values are independent of the scale of the selected polygon. For example, a processing table produced for a hexagon kernel may be used such that an image may appear convolved with the hexagon or any scaled versions of the hexagon (e.g., increase scale, decrease scale).

To produce the processing table for a particular polygon kernel shape, a transfer function may be produced such that the table may be used independent of the polygon kernel scale. The transfer function may also define operations to use the processing table (or tables) for producing an adjusted image such as the blurred image 102. In some implementations, the number of operations defined by the transfer function for image adjustment may also be independent of the polygon kernel scale. For example, an equivalent number of addition and subtraction operations may be defined to use the processing table independent of polygon kernel scale. By using such transfer functions, images may be convolved with arbitrary convex polygons such that operations executed on a per pixel basis is independent of the scale of the polygon shaped kernel. As, such computational operations (e.g., central processing unit (CPU) time) needed for convolution are independent of the scale of the kernel.

Figure 2:
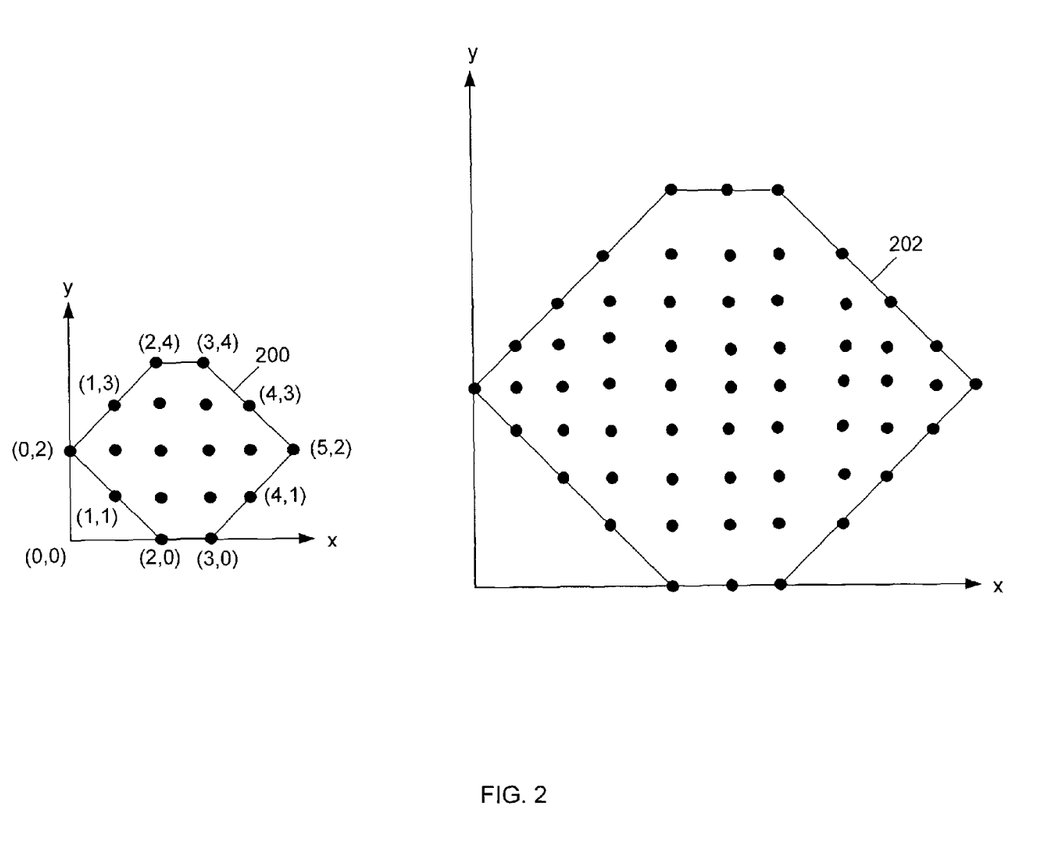
FIG. 2 is a diagram of polygon kernels.

Referring to FIG. 2, illustrations of two exemplary convex integral polygons are presented that may be used as polygon kernels for processing (e.g., blurring) images. In this illustration, one polygon 200 is represented in the first quadrate of a Cartesian coordinate system with corresponding x and y coordinates. While the polygon 200 has a hexagonal shape, in other arrangements, other convex polygon shapes (e.g., rectangle, triangle, diamond-shaped, etc.) may be used as a kernel. Along with being convex, the polygon 200 has a perimeter defined by a series of vertices positioned on coordinates with integer values and interior vertices with integer values. To define the polygon shape, coordinates located within the shape of the polygon (e.g., point 2,2) are assigned a value of one as are coordinates that are located on the polygon boundary (e.g., point 1,1). Each coordinate located external to the polygon (e.g., point 0,3) is assigned a value of zero.

A second polygon 202 is a scaled version (e.g., scaled-up) of the polygon 200. Similar to the polygon 200, the polygon 202 is hexagonal shaped and the vertices of the polygon 202 are positioned upon integer coordinates. As such, the polygon 202 has been scaled by an integer value. For the scenario in which a scaled-down version of a polygon (e.g., polygon 200) is to be used, the vertices of the scaled-down polygon also need to be positioned upon integer coordinates. Also, similar to the polygon 200, the polygon 202 includes vertices that are represented by corresponding integer x and y coordinate values. Values are assigned to the coordinates in a similar manner, coordinates located within and on the boundary of the polygon are assigned a value of one while coordinates external to the polygon are assigned values of zero.

One or more techniques may be used to define a transfer function associated with the polygon kernels that can be used to produce a processing table for processing an image. To demonstrate defining a transfer function from a series of vertices, in a one-dimensional scenario, an origin may be defined such that vertices are represented with coordinates in positions relative to the origin. Generally, by summing the coordinate values a transfer function may be determined as a function of the vertices. For example, a one dimension infinite series of vertices may be expressed as:

$$x^1 + x^2 + x^3 + x^4 \ldots = \frac{x}{1-x}, \qquad (2)$$

in which $x^n$ represents a vertex shifted by a value n from the origin and the infinite series collapses into an expression that includes finite polynomials. As such, a transfer function may be produced from a summation of vertices. Expanding into two dimensions, vertices of a polygon represented in a Cartesian coordinate system may be used to define a transfer function. For example, an integral convex polygon with the shape of a rectangle may be represented in two dimensions as:

$$g(x) = \begin{cases} 1 & \text{for } x_1 \geq 0 \text{ and } x_1 < n \text{ and } y \geq 0 \text{ and } y < n \\ 0 & \text{otherwise} \end{cases} \qquad (3)$$

Similar to the one-dimensional scenario, vertices of the two-dimensional rectangle of equation (3) may be summed as to produce a transfer function G(z):

$$\begin{aligned} G(z) &= \sum_{x=0}^{n-1} \sum_{y=0}^{n-1} z_1^{-x} z_2^{-y} \\ &= \sum_{x=0}^{n-1} z_1^{-x} \sum_{y=0}^{n-1} z_2^{-y} \\ &= \frac{(1-z_1^{-n})(1-z_2^{-n})}{(1-z_1^{-1})(1-z_2^{-1})} \\ &= \frac{1 - z_1^{-n} - z_2^{-n} - z_1^{-n} z_2^{-n}}{1 - z_1^{-1} - z_2^{-1} - z_1^{-1} z_2^{-1}} \end{aligned} \qquad (4)$$

Generally, the transfer function G(z) includes a polynomial in $z_i$ (and their reciprocals) in the numerator (i.e., $1-z_1^{-n}-z_2^{-n}-z_1^{-1}z_2^{-1}$) and another polynomial in $z_i$ (and their reciprocals) in the denominator (i.e., $1-z_1^{-1}-z_2^{-1}-z_1^{-1}z_2^{-1}$), which may used to produce a processing table from the represented running sum. Furthermore, the numerator may be used to define series of operations (e.g., summing operation, subtraction operations, etc.) for using the processing table to process an image (e.g., produce a blurred image). While, a rectangular polygon is represented by the transfer function G(z) in equation (4), transfer functions may be produced for convex integral polygons of other shapes.

A convex integral polygon such as polygon 200 may be represented as a sum of rational functions that each represent infinite series and that collapse into a rational function whose numerator and denominator are polynomials (in the $z_i$ and their reciprocals) representing a finite series. As such, the polygon may be scaled to increase or decrease in size for creating different image adjustments (e.g., blurred images with various levels of severity) while using the same transfer function and processing table produced from the transfer function. One or more techniques and methodologies may be implemented to define rational functions to represent the polygon. For example, using the vertices of the polygon, tangent cones (e.g., a region of a plane bounded by a pair of intersecting lines) may be defined to represent rational functions that may be summed to produce a transfer function. In some arrangements the tangent cones may be summed to collapse into one or more polynomials in compliance with a theorems such as Brion's theorem or the Lawerance-Varchenko theorem, both of which are described in "Formulas of Brion, Lawrence, and Varchenko on Rational Generating Function for Cones", Matthias Beck, Christian Hasse and Frank Sottile, (2006-05-16) oai:arXiv.org:math/0506466v3, which is herein incorporated by reference.

Figure 3:
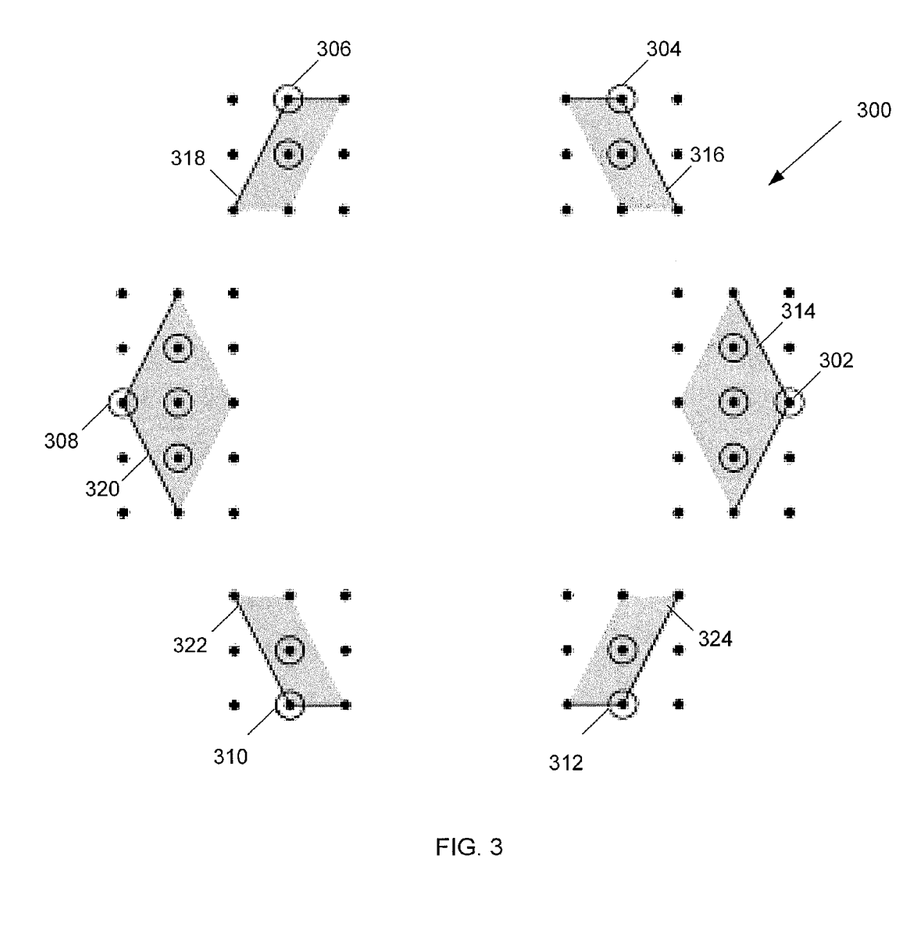
FIG. 3 is illustrates tangent cones of a polygon kernel.

Referring to FIG. 3, portions of a hexagon-shaped polygon kernel 300, which is defined as H(a,b,c), include six corner vertices 302, 304, 306, 308, 310, 312. Opposite sides of the kernel 300 are parallel and of equivalent lengths and edges of the kernel are defined by vectors (a,0), (b,2b) and (−c,2c). Of the six corner vertices, vertex 302 is located (0,0), vertex 304 is located at (a,0), vertex 306 is located (a+b, 2b), vertex 308 is located at (a+b−c, 2b+2c), vertex 310 is located (b−c, 2b+2c) and vertex 312 is located at (−c, 2c). As such, for this exemplary polygon shape, a hexagon with coordinates (a,b,c)=(2,1,1) produces an approximate regular hexagon.

For each of the corner vertices 302-312, a tangent cone (e.g., tangent cone 314, 316, 318, 320, 322, 324) is illustrated with respective parallelepipeds intersecting vertices positioned upon coordinates with integer values. For example, the parallelepiped of vertex 302 includes integer points (0,0), (−1,−1), (−1,0) and (−1, 1), relative to the vertex. Such integer values may be represented as $1+z_1^{-1}z_2^{-1}+z_1^{-1}+z_1^{-1}z_2$ and provides the numerator of a transfer function (referred to as $F_3$) associated with the tangent cone 314 (of vertex 302). The tangent cone 314 is defined by coordinates (−1,2) and (−1,−2), which are referred to as generators, and provide the denominator of the transfer function $F_3$ as $(1-z_1^{-1}z_2^{2})(1-z_1^{-1}z_2^{2})$. Similarly, transfer functions may be defined for each of the tangent cones 314-324:

$$F_1 = (z_1, z_2) = \frac{1+z_2}{(1-z_1)(1-z_1^{-1}z_2^2)}; \quad (5)$$

$$F_2 = (z_1, z_2) = \frac{1+z_2}{(1-z_1^{-1})(1-z_1z_2^2)}; \quad (6)$$

$$F_3 = (z_1, z_2) = \frac{1+z_1^{-1}(1+z_2+z_2^{-1})}{(1-z_1^{-1}z_2^2)(1-z_1^{-1}z_2^{-2})}; \quad (7)$$

$$F_4 = (z_1, z_2) = \frac{1+z_2^{-1}}{(1-z_1^{-1})(1-z_1^{-1}z_2^{-2})}; \quad (8)$$

$$F_5 = (z_1, z_2) = \frac{1+z_2^{-1}}{(1-z_1)(1-z_1^{-1}z_2^{-2})}; \quad (9)$$

$$F_6 = (z_1, z_2) = \frac{1+z_1(1+z_2+z_2^{-1})}{(1-z_1z_2^2)(1-z_1z_2^{-2})}. \quad (10)$$

To produce the transfer function, G(z), for the polygon 300, the transfer functions $F_1$-$F_6$ (associated with each tangent cone) may be summed in a manner similar to as provided by Brion's theorem:

$$G_{a,b,c}(z) = \sum_{v \in Vert(P)} F(cone(P, v); z). \quad (11)$$

In this example, application of Brion's theorem sums the tangent cone transfer functions to produce:

$$G_{a,b,c}(z_1, z_2) = (z_1 - z_1^{2+a} + z_1 z_2 - z_1^{2+a} z_2 - z_1^2 z_2^2 + z_1^{1+a} z_2^2 - z_1^2 z_2^3 + z_1^{1+a} z_2^3 - z_1^{1+a+b} z_2^{1+2b} + z_1^{2+a+b} z_2^{1+2b} - z_1^{1+a+b} z_2^{2+2b} + z_1^{3+a+b} z_2^{2+2b} - z_1^{1+a+b} z_2^{3+2b} + z_1^{2+a+b} z_2^{3+2b} + z_1^{2+a+b} z_2^{2+a} z_1^{1-c} z_2^{1+2c} + z_1^{2-c} z_2^{1+2c} + z_1^{2-c} z_2^{2+2c} - z_1^{-c} z_2^{2+2c} - z_1^{-c} z_2^{2+2c} - z_1^{1-c} z_2^{3+2c} + z_1^{2-c} z_2^{3+2c} - z_1^{2+b-c} z_2^{1+2b+2c} + z_1^{1+a+b-c} z_2^{1+2b+2c} + z_1^{1+a+b-c} z_2^{2+b-c} z_2^{2+2b+2c} + z_1^{1+a+b-c} z_2^{2+2b+2c} + z_1^{1+a+b-c} z_2^{3+2b+2c} + z_1^{1+b-c} z_2^{3+2b+2c} - z_1^{2+a+b-c} z_2^{3+2b+2c} - z_1^{4+2b+2c} z_2^{2+a+b-c} - z_1^{4+2b+2c} z_2^{2+a+b-c} - z_1^{4+2b+2c})/(z_1 - z_1^2 - z_2^2 + z_1 z_2^2 - z_1 z_2^2 + z_1^3 z_2^2 + z_1 z_2^4 - z_1^2 z_2^4) \quad (12)$$

By using the transfer function $G_{a,b,c}(z_1,z_2)$ a processing table may be produced and used to adjust a image. In particular, the polynomial expression of the denominator of $G_{a,b,c}(z_1,z_2)$ may be used to produce the processing table and the polynomial of the numerator may provide operations to use the processing table to produce the processed image. Since the processing table produced from the denominator polynomial is independent of the scale of the polygon 300, the table may be used to process an image with various scaled versions of the polygon. Furthermore, while the polynomial of the numerator may be used to compute various processed images (e.g., blurred images) using the processing table, the number of operations (e.g., additions, subtractions, etc.) are also independent of the scale of the polygon. However, the individual operations may depend upon the scale of the polygon 300.

In this particular example, Brion's theorem was implemented to produce a transfer function for the polygon 300 independent of the polygon's scale, however other techniques and methodologies may be in other implementations. For example, the Lawrence-Varchenko theorem may be used to collapsing transfer functions of cones. Upon producing the transfer function, the expressed may be reduced to computer instructions for generating the processing table and for using the area table for processing images.

Figure 4:
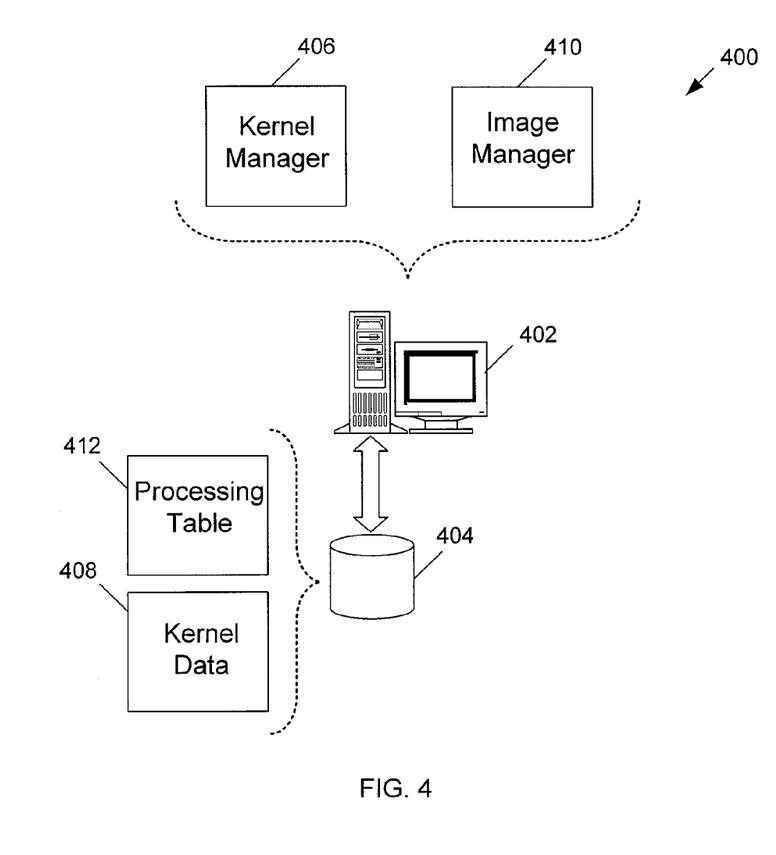
FIG. 4 is a diagram of an image processing system.

Referring to FIG. 4, an image processing system 400 includes a computer system 402 (or other type of computing device) for calculating a kernel, which includes a transfer function, based upon a selected convex integral polygon and using the kernel to applying effects (e.g., image blurring, etc.) to one or more images. Along with generating the kernel, the computer system 402 is capable of storing data representative of the kernel, processed images and other associated information. Along with components (e.g., interface cards, etc.) for receiving data (e.g., images) from various sources (e.g., an image library, a shape library, the Internet, other computer systems, etc.), the computer system 402 also includes memory (not shown) and one or more processors (also not shown) to execute processing operations. A storage device 404 (e.g., a hard drive, a CD-ROM, a Redundant Array of Independent Disks (RAID) drive, etc.) is in communication with the computer system 402 and is capable of storing and retrieving data associated with kernel generation (e.g., polygon representations, etc.) along with data for using a kernel (e.g., images, processed images, etc.).

In this arrangement, to generate a kernel, a kernel manager 406 is executed by the computer system 402. Various types of kernels may be generated based upon user-selected polygons or other methodologies (e.g., a polygon provided from a stored data file). For example, the kernel manager 406 may present a list of user-selectable polygons on a monitor included in the computer system 402. In another arrangements, data representing a polygon may be loaded from a source such as a kernel data file 408 stored in the storage device 404. As mentioned, above one or more techniques may be used for producing a kernel, for example, transfer functions associated with tangent cones may be summed (e.g., in compliance with Brion's theorem) to produce a transfer function of the polygon. Cone transfer functions may also be collapsed to produce a polygon kernel transfer function with the Lawrence-Varchenko theorem. The kernel manager 406 may also provide functionality such as storing data that represents that the kernel transfer function (e.g., the kernel data file 408), updating data files, deleting data files, etc.

Upon producing a transfer function (e.g., using Brion's theorem, the Lawrence-Varchenko theorem, etc.), one or more techniques and methodologies may be implemented to produce and use a corresponding processing table. For example, the numerator of the transfer function may be considered as representing a finite impulse response (FIR) filter and the denominator may be considered as representing an infinite impulse response (IIR) filter. By using techniques, such as the techniques described in "Multidimensional Signal, Image and Video Processing and Coding," by J. W. Woods (2006), which is herein incorporated by reference, one or more algorithms may be developed. For example, one portion of an algorithm may be derived from the IIR filter representation (e.g., the denominator) for producing a processing table and another portion of an algorithm may be derived from the FIR filter representation (e.g., the numerator) for providing operations to use the processing table.

Figure 5:
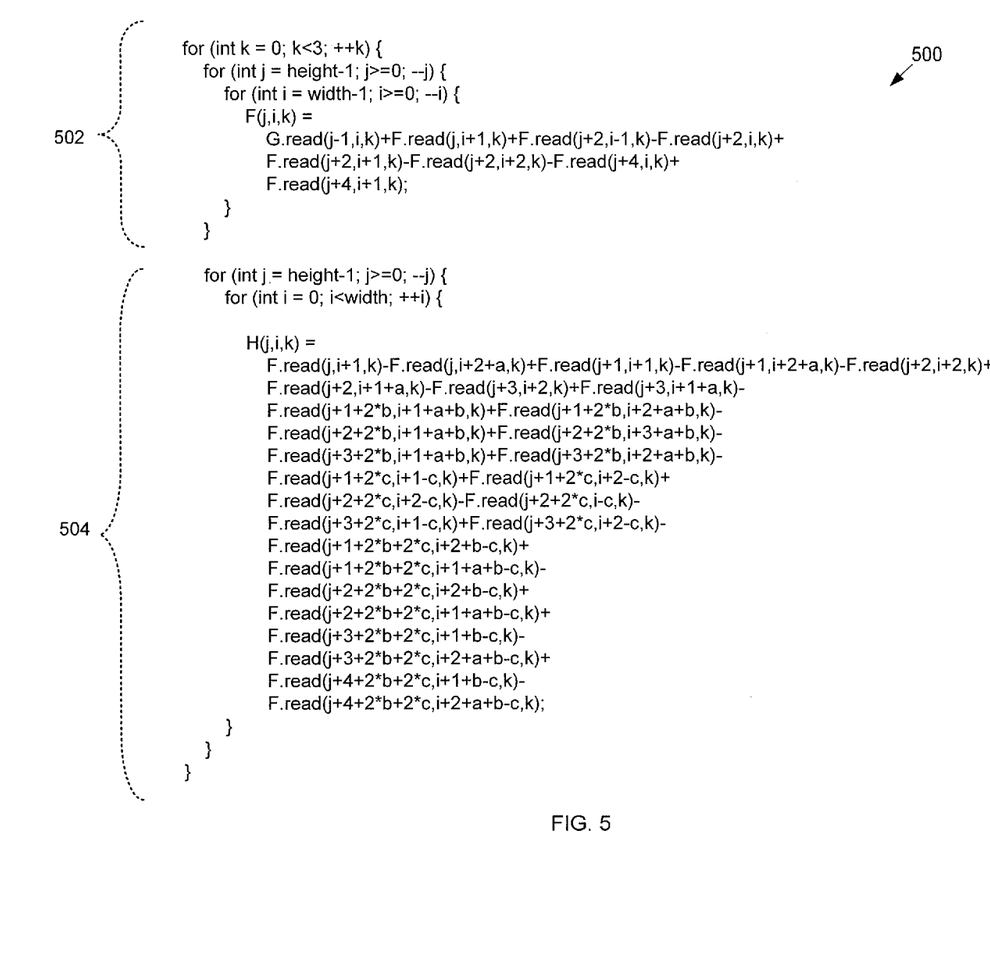
FIG. 5 is illustrates a portion of computation code.

Referring briefly to FIG. 5, a portion of code 500 (i.e., C++ code) is presented that illustrates production of a transfer function. In particular, a transfer function is produced for a hexagonal shaped kernel (similar to the kernels 200 and 202 shown in FIG. 2). A first portion 502 of the code 500 corresponds the denominator of the transfer function and a second portion 504 of the code corresponds to the numerator of the transfer function. The variables F, G and H correspond to three-dimensional array objects (e.g., x and y being two dimensional and the third dimension being one of three color channels R, G or B). In the code, the command "F(i,j,k)=" represents setting the value at the (i,j,k) position in array F and the command "F.read(i,j,k)" reads the value from the position (i,j,k) from the F array. The variables "a", "b" and "c" are used to represent the lengths of the sides of the hexagonal kernel. As such, the number of computations executed by the code 500 (and computational time) is independent of the values of "a", "b" and "c" (i.e., the size of the polygon).

Returning to FIG. 4, the kernel manager 406 may also use various techniques and methodologies to generate polygons or different shapes and scales. For example, automated software packages (e.g., drawing and painting packages, CAD packages, photograph editing packages, etc.) may be used along with user input (e.g., hand drawings produced by a graphic artist) to produce polygons for processing images.

To process images with one or more kernels, an image manager 410 is also executed by the computer system 402. Along with retrieving and storing images, the image manager 410 may access the kernel data file 408 for image processing preparation. For example, the image manager 410 may produce a processing table 412 from an image and the denominator of a kernel transfer function stored in the kernel data file 408. While one processing table 412 is illustrated as being produced by the image manager 410, in some arrangements numerous tables may be produced for kernels associated with other polygon shapes along with tables for and other images to be processed.

The image manager 410 may also use the processing table 412 to produce a processed image (e.g., a blurred image) along with other information. For example, the kernel data file 408 may be accessed by the image manager 410 for operations represented in the numerator of a kernel transfer function and the operations may be executed with the processing table 412 to process an image. For example, addition and subtraction operations may be provided by the kernel data file 408 for processing an image represented in the processing table 412. Other information may also be used in conjunction with the processing table 412. For example, data representing a polygon scale may be used with the kernel data and the processing table 412 to produced a blurred image.

The kernel manager 406 and the image manager 410 are represented as separate processes, however, in some arrangements, the some of the functionality of one process may be combined with the functionality of the other process. The functionality of the both the kernel manager 406 and the image manager 410 may also be disturbed to three or more separate processes executed by the computer system 402 or executed in a distributed manner with two or more computing devices.

Figure 6:
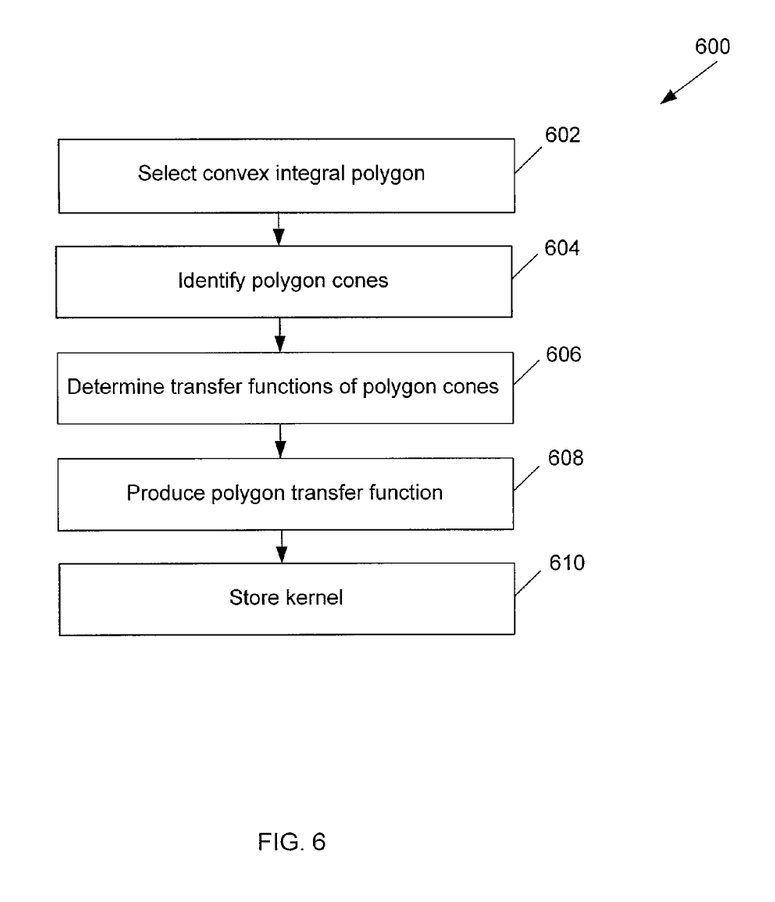
FIG. 6 is a flowchart of operations of a kernel manager.

Referring to FIG. 6, a flowchart 600 represents a particular arrangement of operations of the kernel manager 406. The operations may be executed by a single computer system (e.g., computer system 402) or multiple computing devices. Along with being executed at a single site (e.g., at one computer system), operation execution may be distributed among two or more sites.

Operations include selecting 602 a convex integral polygon such as a hexagon, rectangle, diamond, triangle or other similar shape. In general, the polygon is scaled to a particular size and is defined by a set of vertices. Operations also include identifying 604 cones (e.g., tangent cones) associated with the polygon, for example, corner vertices (as shown in FIG. 3) may be used to identify tangent cones. Operations also include determining 606 transfer functions associated with the identified cones. For example, coordinates representing vertices associated with cones may be used to define the numerator and denominator of the transfer function. Producing 608 a polygon transfer function may be provided by summing the cone transfer functions, for example, in compliance with Brion's theorem, Lawrence-Varchenko theorem or other methodology. Operations also include storing 610 a kernel, which represents the polygon transfer function, in a storage unit such as storage device 404.

To perform the operations described in flow chart 600, the kernel manager 406 may perform any of the computer-implement methods described previously, according to one implementation. For example, a computer system such as computer system 402 (shown in FIG. 4) may execute the kernel manager 406. The computer system may include a processor (not shown), a memory (not shown), a storage device (e.g., storage device 304), and an input/output device (not shown). Each of the components may be interconnected using a system bus or other similar structure. The processor is capable of processing instructions for execution within the computer system. In one implementation, the processor is a single-threaded processor. In another implementation, the processor is a multi-threaded processor. The processor is capable of processing instructions stored in the memory or on the storage device to display graphical information for a user interface on the input/output device.

Figure 7:
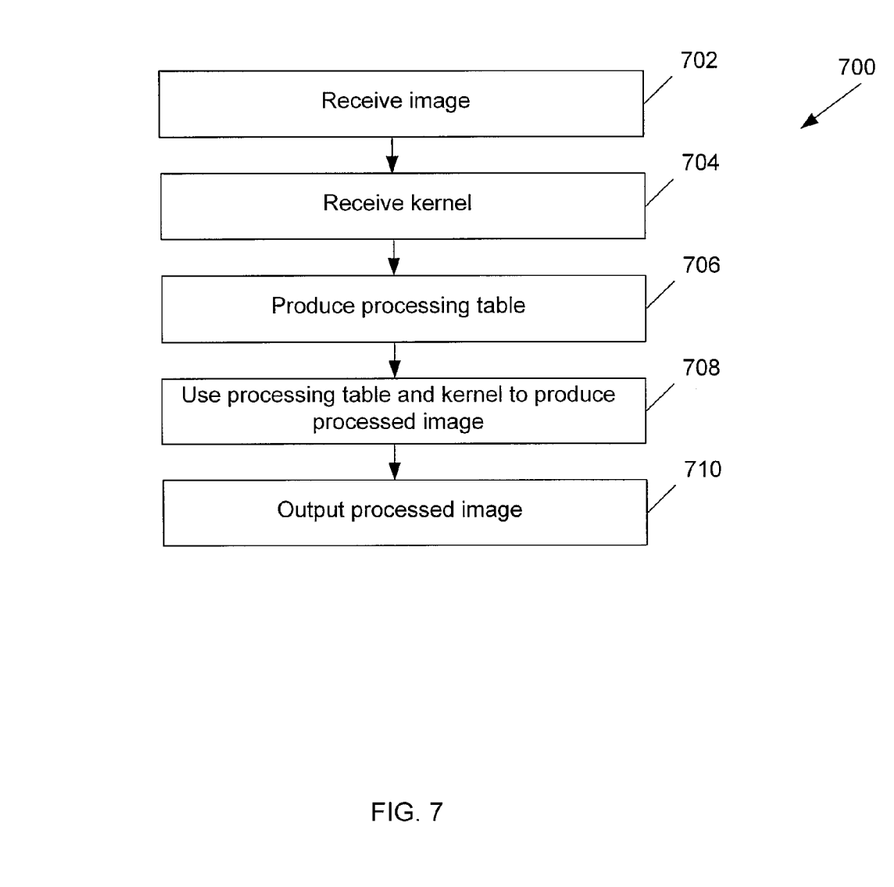
FIG. 7 is a flowchart of operations of a image manager.
Like reference symbols in the various drawings indicate like elements.

Referring to FIG. 7, a flowchart 700 represents some operations of the image manager 406. The operations may be executed by a single computer system (e.g., computer system 402) or multiple computing devices. Along with being executed at a single site (e.g., at one computer system), operation execution may be distributed among two or more sites.

Operations include receiving 702 an image, for example, from a storage device or type of source and receiving 704 a kernel (e.g., from the storage device 404). Using the kernel, operations may include producing 706 a processing table from the received image. For example, a transfer function representation of the kernel may include a polynomial (in the denominator of the transfer function) that may be used to produce the processing table from the pixels of the received image. Operations may also include using 708 the processing table to process the received image. For example, a polynomial of the kernel (in the numerator of the transfer function) may define a series of addition and/or subtractions operations using processing table values to convolve the polygon with the image to produce a blurred image. Upon processing the image with the processing table, operations may include outputting 710 the processed image. For example, the processed image may be output for display on a computer monitor or other type of viewing device. The processed image may also be output for producing a hardcopy on a printing device or stored in a storage unit such as storage device 404.

To perform the operations described in flow charts 600 and 700, one or both of the kernel manager 406 and the image manager 410 may perform any of the computer-implement methods described previously, according to one implementation. For example, a computer system such as computer system 402 (shown in FIG. 4) may execute the kernel manager 406. The computer system may include a processor (not shown), a memory (not shown), a storage device (e.g., storage device 404), and an input/output device (not shown). Each of the components may be interconnected using a system bus or other similar structure. The processor is capable of processing instructions for execution within the computer system. In one implementation, the processor is a single-threaded processor. In another implementation, the processor is a multi-threaded processor. The processor is capable of processing instructions stored in the memory or on the storage device to display graphical information for a user interface on the input/output device.)

The memory stores information within the computer system. In one implementation, the memory is a computer-readable medium. In one implementation, the memory is a volatile memory unit. In another implementation, the memory is a non-volatile memory unit.

The storage device is capable of providing mass storage for the computer system. In one implementation, the storage device is a computer-readable medium. In various different implementations, the storage device may be a floppy disk device, a hard disk device, an optical disk device, or a tape device.

The input/output device provides input/output operations for the computer system. In one implementation, the input/output device includes a keyboard and/or pointing device. In another implementation, the input/output device includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the following claims.

What is claimed is:

1. A computer-implemented method comprising:
   selecting, by a processor, a polygon that includes a convex shape defined by vertices represented by integer coordinates;
   determining a polygon transfer function from cones defined by a portion of the vertices, wherein the polygon transfer function defines image processing operations independent of the scale of the polygon.

2. The computer-implemented method of claim 1, in which determining the polygon transfer function includes summing transfer functions of the cones.

3. The computer-implemented method of claim 1, further comprising:

producing a table from operations defined by the polygon transfer function.

4. The computer-implemented method of claim 3, in which the operations are defined by the denominator of the transfer function.

5. The computer-implemented method of claim 3, in which the operations include addition operations.

6. The computer-implemented method of claim 3, further comprising:
processing an image with the table from operations defined by the polygon transfer function.

7. The computer-implemented method of claim 6, in which the operations to process the image are defined by the numerator of the polygon transfer function.

8. The computer-implemented method of claim 7, in which the operations to process the image are dependent upon the scale of the polygon.

9. The computer-implemented method of claim 7, in which the number of operations to process the image are independent of the scale of the polygon.

10. The computer-implemented method of claim 1, in which the shape of the polygon is a hexagon.

11. A system comprising:
a kernel manager to select a polygon that includes a convex shape defined by vertices represented by integer coordinates, the kernel manager is further configured to determine a polygon transfer function from cones defined by a portion of the vertices, wherein the polygon transfer function defines image processing operations independent of the scale of the polygon.

12. The system of claim 11, further comprising:
an image manager to process an image with a processing table and operations defined by the polygon transfer function, wherein the processing table is produced from operations defined by the polygon transfer function.

13. The system of claim 12, in which the operations to produce the processing table are defined by the denominator of the transfer function.

14. The system of claim 12, in which the operations to process the image with the processing table are defined by the numerator of the polygon transfer function.

15. The system of claim 12, in which the operations to process the image are dependent upon the scale of the polygon.

16. The system of claim 12, in which the number of operations to process the image are independent of the scale of the polygon.

17. The system of claim 11, in which the shape of the polygon is a diamond.

18. A computer program product tangibly embodied in a storage device and comprising instructions that when executed by a processor perform a method comprising:
selecting a polygon that includes a convex shape defined by vertices represented by integer coordinates;
determining a polygon transfer function from cones defined by a portion of the vertices, wherein the polygon transfer function defines image processing operations independent of the scale of the polygon.

19. The computer program product of claim 18, in which determining the polygon transfer function includes summing transfer functions of the cones.

20. The computer program product of claim 18, further comprising instructions to:
produce a processing table from operations defined by the polygon transfer function.

21. The computer program product of claim 20, in which the operations are defined by the denominator of the transfer function.

22. The computer program product of claim 20, further comprising instructions to:
process an image with the processing table from operations defined by the polygon transfer function.

23. The computer product of claim 22, in which the operations to process the image are defined by the numerator of the polygon transfer function.

24. The computer product of claim 23, in which the operations to process the image are dependent upon the scale of the polygon.

25. The computer product of claim 23, in which the number of operations to process the image are independent of the scale of the polygon.

* * * * *

UNITED STATES PATENT AND TRADEMARK OFFICE
CERTIFICATE OF CORRECTION

| | | |
|---|---|---|
| PATENT NO. | : 8,203,570 B1 | Page 1 of 1 |
| APPLICATION NO. | : 12/055034 | |
| DATED | : June 19, 2012 | |
| INVENTOR(S) | : Dan Piponi | |

It is certified that error appears in the above-identified patent and that said Letters Patent is hereby corrected as shown below:

Column 12, Line 32, In Claim 23, after "computer" please insert -- program --

Column 12, Line 35, In Claim 24, after "computer" please insert -- program --

Column 12, Line 38, In Claim 25, after "computer" please insert -- program --

Signed and Sealed this
Fourteenth Day of August, 2012

David J. Kappos
*Director of the United States Patent and Trademark Office*